Jan. 23, 1923.
G. C. STRONG.
AUTOMOBILE SAFETY PASSING LIGHT.
FILED NOV. 17, 1921.
1,443,290
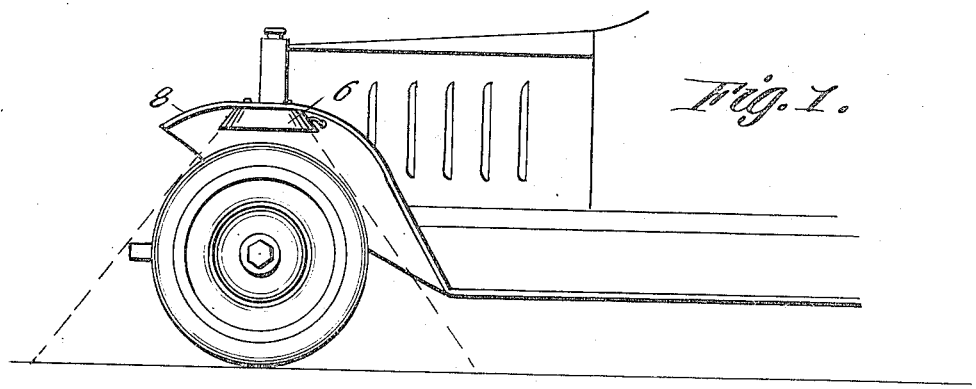
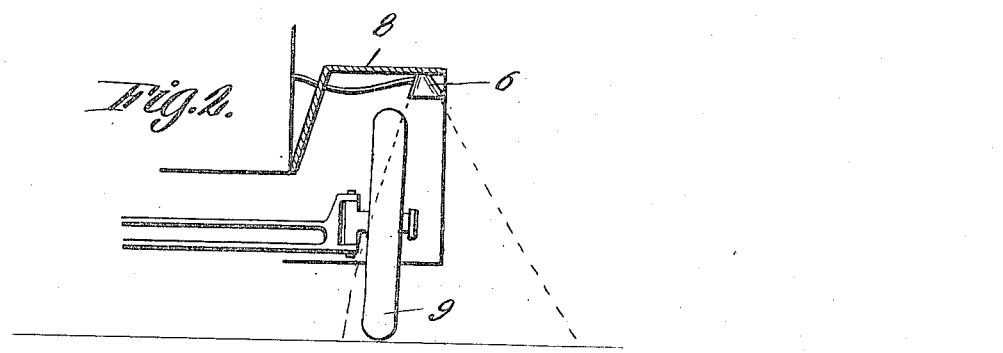
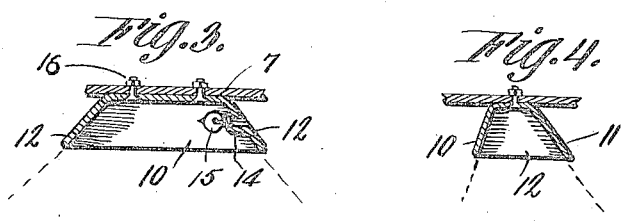
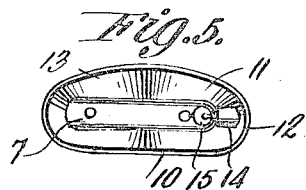
WITNESSES
Inventor
GEORGE C. STRONG
By Richard B. Owen
Attorney Patented Jan. 23, 1923.

1,443,290

UNITED STATES PATENT OFFICE.

GEORGE C. STRONG, OF NORFOLK, VIRGINIA.

AUTOMOBILE SAFETY-PASSING LIGHT.

Application filed November 17, 1921. Serial No. 515,928.

*To all whom it may concern:*

Be it known that I, GEORGE C. STRONG, a citizen of the United States, residing at Norfolk, in the county of Norfolk and State of Virginia, have invented certain new and useful Improvements in Automobile Safety-Passing Lights, of which the following is a specification.

This invention relates to new and useful improvements in lights for vehicles and more particularly to the arrangement thereof in relation to the vehicle and the configuration of the reflector whereby certain parts of the vehicle which are arranged closest to passing vehicles will be illuminated.

The invention is also designed for a signalling capacity whereby it will cast a bright light upon the ground when the driver desires to inform vehicles in the rear that they should slow up for him to stop or make a turn.

Another important object of the invention resides in the simplicity of the device and means whereby it is readily attachable to every make of motor vehicle.

Other objects and advantages of the invention will become apparent during the course of the following description.

In the drawings forming a part of the description and wherein like numerals are employed to designate like parts throughout the several views;

Figure 1 is a side elevation of a motor vehicle with the invention applied thereto.

Fig. 2 is a transverse section through the same.

Fig. 3 is a longitudinal section through the invention.

Fig. 4 is a transverse section through the same, and

Fig. 5 is a plan looking into the lower end of the device.

This invention is devised to eliminate the many dangers present when motor vehicles pass one another on dark roads at night and the great uncertainty which every motorist feels when compelled to pass another motor vehicle approaching in the opposite direction on a dark road at night, and especially where the road is just wide enough to permit the passage of two motor vehicles travelling in opposite directions. At present, on dark roads at night it is deemed courteous for the approaching motorist to switch off his headlights which glare into the eyes of the motorist travelling in the opposite direction so that the latter may be better able to steer past the approaching vehicle. However, when the headlights of the approaching vehicle are turned off, the glare in the motorist's eyes temporarily blinds him and he is compelled to take a great chance in passing the other vehicle. Even though the glaring headlights are not used, nevertheless on dark roads it is impossible for the motorist to accurately judge the width of the approaching vehicle so that he can allow sufficient space for the other vehicle to safely pass by without colliding into the wheel or mud guard of the approaching vehicle. My invention eliminates all of this uncertainty which exists when automobiles pass one another at night, by illuminating the left front wheel of the vehicle, the left hand end of the front bumper and the front end of the running board on the left side of the vehicle. Consequently, the illumination of these parts or equivalent parts renders it possible for the motorist to turn off or dim all lights on his vehicle except that which illuminates these parts, and the motorist approaching in the opposite direction may clearly see the portion of the vehicle approaching in the opposite direction nearest his vehicle so that passage of the vehicles may be accomplished with great certainty and without the fear of collision.

To accomplish these desirable ends and others which will hereinafter appear, I provide a light which embodies a casing 6 equipped with a substantially flat top 7, or one of such configuration that it may snugly fit up against the under side of the left hand front mudguard 8 of a vehicle. This casing 6 is preferably located adjacent the outermost edge of the mud-guard and well to one side of the left hand front wheel 9 of the vehicle so that mud and gravel thrown up by this wheel will not damage the casing or light located therein and to preclude against breakage of the device when the vehicle travels over rough roads where at times the vehicle will receive such jolts as to cause or almost cause the wheel to bump against the mud-guard. The walls of the casing are so shaped as to present an elliptical formation at the bottom edge. The inner side wall 10 of the casing does not curve outwardly to follow the configuration of an ellipse, but is perfectly straight as clearly shown in Figure 5 and flares outwardly and downwardly; or with respect to the automobile inwardly thereof and downwardly. The other side wall 11 of the casing as well as the end walls 12 thereof follow closely to the configuration of an ellipse and flare outwardly and downwardly to a greater extent than the inner side wall 10 so that the light reflected from the casing will encompass the left hand side of the front bumper of the motor vehicle to which the device is applied, the outer half of the left hand front wheel and the forward end of the left hand running board. The inner surface of the entire casing is equipped with a reflecting surface 13 which may be accomplished by silvering the casing, or providing the walls thereof with any desired form of reflector means. It is also to be particularly noted, as is illustrated in Figure 2, that light from the device is shed well to one side of the vehicle to illuminate a certain area of the ground to the left of the vehicle so that this illuminated area may be seen by drivers of vehicles approaching in the rear of one carrying the safety passing light. The object of this is that the driver of the vehicle may switch on his safety passing light when he is about to stop or make a turn so as to inform vehicles in the rear as well as to the front and left hand side that they should slow down or stop to permit the execution of his contemplated movement. After the vehicle carrying the passing light has executed its movement, the light may be switched off and it will therefore be obvious that the device may be use as a signal as well as to insure the safe passage of vehicles passing one another on dark roads.

The rear end of the casing is equipped with a longitudinally extending socket element 14 for the reception of an electric light bulb 15. This bulb receives current from the lighting system in the automobile and is adapted to be turned off and on by the switch provided for this purpose and located adjacent the driver's seat. The open end of the casing may be provided with a transparent plate if desired to prevent mud and dust from the front wheel from gaining access to the reflecting surface of the casing and light bulb. I have illustrated the casing attached to the mud-guard by means of bolts 16 which are probably the most inexpensive means for fastening the device to the vehicle, but it is to be understood that I do not limit myself to such details.

In use, the light is ordinarily switched out by the switch herein mentioned, and when the vehicle is traveling over a dark road at night and another vehicle is approaching in the opposite direction, the switch is operated to turn on the light 15 simultaneous with the turning off or dimming of other lights in the front of the vehicle. Consequently, the only part of the car illuminated will be the left hand end of the front bumper, the outer half of the left hand front wheel and the forward end of the left hand running board and a portion of the road alongside of the vehicle, whereby the vehicle approaching in the opposite direction may safely pass the other vehicle without danger of colliding with same.

The foregoing description and accompanying drawings have reference to what might be considered to be the approved or preferred form of my invention, I desire it to be understood that I may make changes in the construction, combination and arrangement of parts, material, dimensions, etc. as may prove expedient and fall within the scope of the appended claim.

Having thus fully described my invention what I claim as new and desire to secure by Letters Patent:

The combination with a mud guard of a motor vehicle, of a reflector having a substantially flat top and downwardly extending outwardly flared sides and ends, said sides and ends being shaped to present an elliptical formation at the bottom and one side being longitudinally curved, a light carried by the reflector, and means for turning on and off the light.

In testimony whereof I affix my signature in presence of two witnesses.

GEORGE C. STRONG.

Witnesses:
 A. J. STRONG,
 C. G. OWINGS.